March 13, 1956 — F. B. STULEN — 2,738,148
METHOD OF DEVELOPING LIFT FROM THE PROPELLER BLADES OF AN AIRPLANE
Filed Sept. 29, 1952
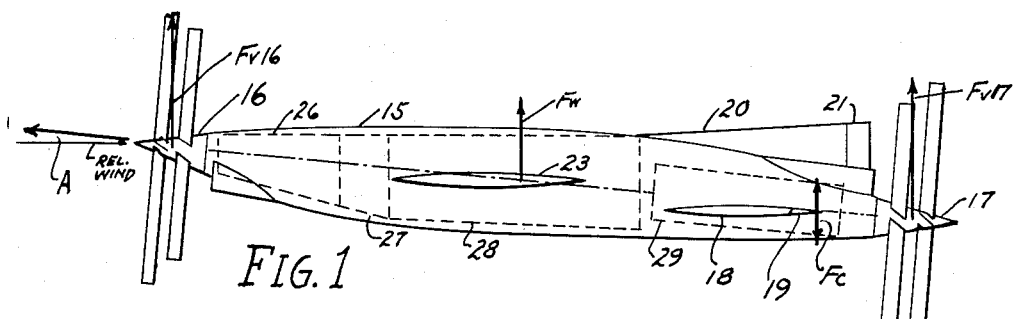
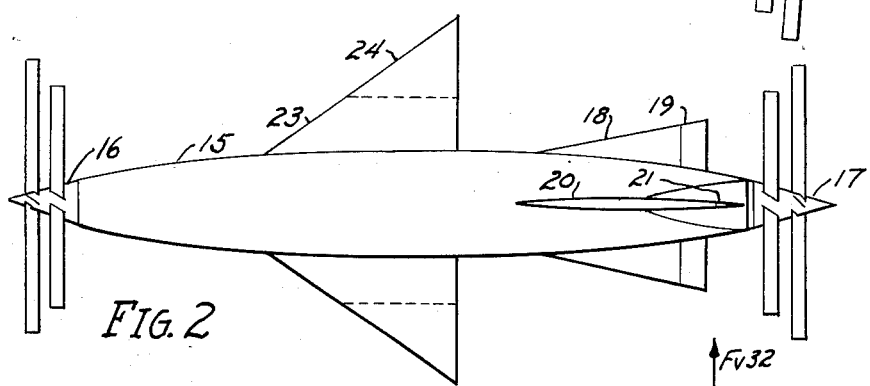
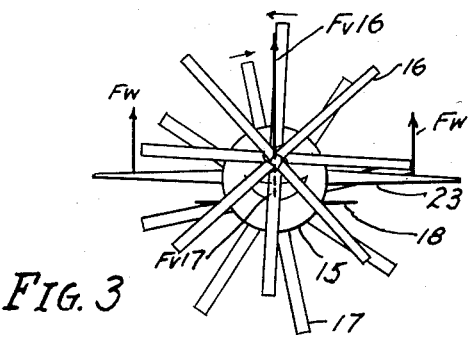
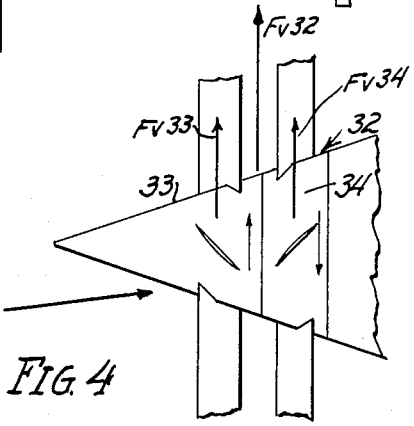
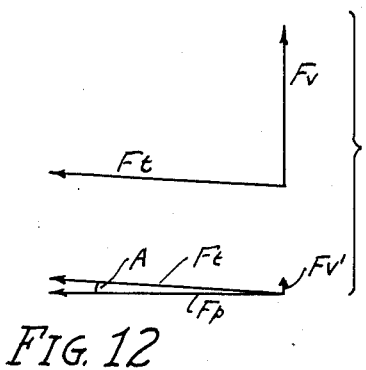
INVENTOR
FOSTER B. STULEN
BY
ATTORNEY March 13, 1956  F. B. STULEN  2,738,148
METHOD OF DEVELOPING LIFT FROM THE
PROPELLER BLADES OF AN AIRPLANE
Filed Sept. 29, 1952  2 Sheets-Sheet 2

INVENTOR.
FOSTER B. STULEN
BY
*Godfrey B. Speir*
ATTORNEY

United States Patent Office 2,738,148
Patented Mar. 13, 1956

2,738,148

METHOD OF DEVELOPING LIFT FROM THE PROPELLER BLADES OF AN AIRPLANE

Foster B. Stulen, Boonton, N. J., assignor to Curtiss-Wright Corporation, a corporation of Delaware Application September 29, 1952, Serial No. 311,968

2 Claims. (Cl. 244—65)

This invention relates to a novel method of operating propeller driven aircraft, adapted to fly in the earth's atmosphere preferably at supersonic speed, and securing all of its propulsion and either all or a major part of its lift from the propellers.

In applying the invention, lift forces are derived from the propeller system by tilting the propeller axis at a small vertical positive angle to the relative wind through which the aircraft passes. This tilting of the propellers develops vertical forces of major magnitude which produce a large amount of lift even though the positive angle between the propeller axis and the relative wind is quite small—of the order of 2 to 12 degrees.

The invention herein consists in the useful application to an aircraft of forces developed by propellers, whereby they may be utilized as lifting forces. In order to comprehend the details and nature of the invention, reference may be made to the drawings which should be read in connection with the detail description following. In the drawings, wherein similar reference characters show similar parts, Fig. 1 is a side elevation of one embodiment of an aircraft according to the invention.

Fig. 2 is a plan of the aircraft.

Fig. 3 is a front elevation of the aircraft.

Fig. 4 is a fragmentary side elevation showing an alternative arrangement of propellers.

Fig. 12 is a force diagram to distinguish between lift secured from propeller forces and lift secured from a tilted thrust axis.

Figure 5:
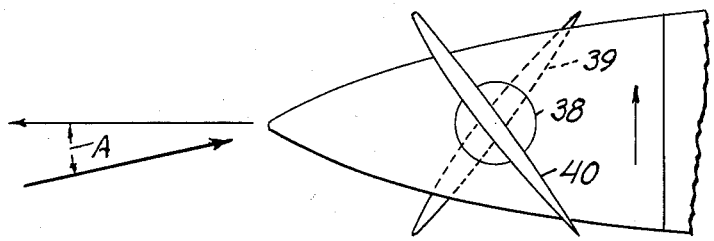
Fig. 5 is an enlarged schematic diagram of a portion of a propeller to assist in showing the derivation of lifting forces.

Figs. 1–3 show an aircraft whose lift is obtained by vertical forces $Fv$ acting on the propeller shafts and derived from the rotation of the propellers when the thrust axes of the propellers are tilted in a positive vertical direction by an angle A to the relative wind. An explanation of the derivation of forces $Fv$ will follow. The aircraft comprises preferably an elongated slim body 15 having a tractor propeller 16 at its forward end and a pusher propeller 17 at its rearward end. The body 15 is provided with horizontal stabilizers 18 having elevators 19, the latter being suitably controlled to provide longitudinal or pitching control of the aircraft and primarily holding the propeller axes at the positive angle A to the relative wind. The aircraft is further provided with a fin 20 and rudder 21 for directional stability and control in the usual fashion. In addition, it may be desirable to provide small wings 23 to augment lift on the aircraft through lift forces $Fw$ developed thereby.

Calculations indicate, depending on weight of aircraft, that either all or the majority of the required lifting forces for a supersonic flight vehicle may be provided by the forces $Fv$ derived from propeller operation. However, additional lifting forces as secured from $Fw$ may be desirable or necessary for take-off and acceleration to supersonic speed. Portions of the wing 23 such as 24 may be jettisonable after supersonic flight has been attained to reduce drag and to eliminate the lift provided thereby when the aircraft reaches an operating condition and speed at which sufficient lift is developed by the propellers.

An exemplary load distribution in the aircraft body 15 is indicated by dotted lines wherein payload 26 may be disposed in the forward zone, control apparatus 27 in the next zone, fuel tankage 28 in the next zone adjacent the center of gravity and a propeller driving turbine 29 in the next zone. The turbine drives both propellers 16 and 17 through appropriate shafting and reduction gearing, and control of the turbine and the propellers may either be associated with the turbine or incorporated in the control apparatus 27.

The propellers 16 and 17 are preferably driven together but in opposite directions at the same speed and are of a suitable automatic variable pitch type wherein pitch control is vested in the control system in conjunction with operation of the turbine to provide the desired thrust and lifting forces.

Vertical forces $Fv$ increase in magnitude with the angle A up to a reasonable limit, and also increase with forward speed. To secure maximum propulsive and lift effectiveness, the propellers 16 and 17 are both indicated as 8-blade units of high solidity, the 8-blade units rotating in opposite directions. $Fv$ 16 shows the lift force derived from the propeller 16, and $Fv$ 17 shows the lift force derived from the propeller 17. The resulting lifting force 2 $Fv$ necessarily acts vertically, half-way between the propellers 16 and 17. At this half-way point, the center of gravity of the aircraft should be located and the wings 23 should likewise be so disposed that the forces $Fw$ act through the center of gravity.

The driving couples of propellers 16 and 17 are equal and opposite normally, and counteract each other to produce no rolling moment on the aircraft. Also, bending couples are imposed on the propeller shaft due to greater thrust occurring on one side of the propeller disc than on the other. But due to opposite rotation of propellers 16 and 17, resultant thrust forces act along the propeller shaft axis, the said bending couples are compensating, leaving no yawing moment on the aircraft, and the propeller torque couples are equal and opposite.

The stabilizer-elevators 18, 19 are disposed to provide vertical control forces $Fc$ to enable guidance and attitude control for the aircraft. Thrust forces $Ft$ are indicated which are the normal propeller propulsive forces by which the aircraft is driven. As heretofore noted, the fin and rudder 21 act for directional control in the usual manner. Roll control for the aircraft may be secured without the use of ailerons by differential control of the pitch of propellers 16 and 17 which will differentially vary the magnitude of the propeller driving couples to yield rolling moments. Alternatively, ailerons may be used on the wings 23 or the elevators 19 may be arranged as elevons for roll control.

Fig. 4 shows an alternative propeller arrangement which may replace each of the propellers 16 and 17. The propeller of Fig. 4 is a dual rotation arrangement 32, known in the art, where an outboard propeller 33 rotates at equal speed in the opposite direction from an inboard generally similar propeller 34. For this dual rotation propeller, the lift forces Fv 33 and Fv 34 from the two elements of the propeller produce the resultant lift force Fv 32 acting through the propeller axis.

The lift force from the propeller, acting normal or transversely to the propeller axis, is one which is inherent in propeller operation where the propeller axis deviates angularly from the direction of the relative wind. The force has been known as propeller "side force" since it manifests itself primarily as an airplane yawing force when an airplane is yawed in the relative wind. More recently, the "side force" has gained significance in creating propeller blade vibrating forces when an aircraft is climbing at a high angle of attack. Each downsweeping blade creates lift higher than normal and each upsweeping blade creates lift lower than normal. The change is cyclic at propeller speed frequency. The lift force fluctuations on each blade tend to bend the blade back and forth at propeller speed frequency, adding stress in the blade which must be compensated for in blade design. The blade lift increment over normal lift rises in the downswing from zero when the blade is vertical to maximum when the blade is horizontal, and drops to zero when the blade is vertically downward. From the vertically downward position, the normal lift of the blade decreases to a minimum at the upswinging horizontal position and then regains normal lift when the blade is disposed vertically upward. In connection with propeller vibration problems, these are known as $l \times P$ aerodynamic forcing impulses. For an overall propeller of three or more blades, the summation of the increasing and decreasing vertical components of lift forces for all blades resolve into a steady transverse force normal to the propeller axis. The magnitude of the transverse force may be definitely established by mathematical procedures. "Side forces" heretofore have been a small but necessary evil. This invention capitalizes on "side forces" and builds them up to a level where they become highly useful.

Before entering into a detailed explanation of the development of transverse propeller forces, reference may briefly be made to Fig. 12. This includes two vector diagrams. In the upper diagram, there is a propulsive or thrust force Ft and a vertical force Fv, derived from the propeller, the latter, as shown, having considerable magnitude where the speed of the aircraft is high. The lower diagram shows the vertical force Fv' developed from the vertical component of normal propeller thrust when the aircraft is inclined. The force Fv' is merely equal to Ft times the sine of the angle A. Obviously, for small angle of attack, the force Fv' is very small compared to the force Fv developed from the transverse force generated in the propeller. This comparison is made so that one may clearly distinguish the type of lift force which is herein contemplated, to avoid confusion with the lifting forces which are derived from a vertical component of thrust force.

It has been long contemplated in the aircraft art to fly aircraft having propellers with their axes disposed at a substantial inclination to the horizontal whereby inclined propeller thrust direction can resolve into both thrust and lifting force components. In much the same manner, it has also been contemplated that rotary wing aircraft, whose rotary wing lifting force is predominantly vertical, be tilted relative to the vertical so propulsion is secured from the horizontal component of the inclined lifting force. Forces of this character are not those which are herein dealt with, although they are additive to the force Fv derived from the propeller.

Figure 13:
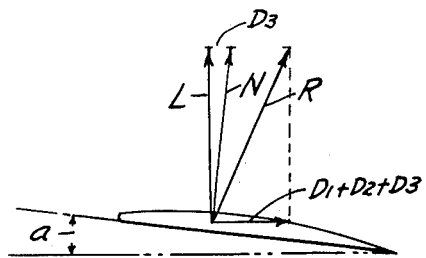
Fig. 13 is a lift-drag diagram of a two-dimensional airfoil to assist in understanding nomenclature used in the specification and in Figs. 5–11.

Reference may now be made briefly to Fig. 13 which shows in part the conventional two-dimensional airfoil diagram, with the airfoil at an angle of attack $a$ to the relative wind. Ordinarily, the lift force L is, by definition, a force which acts normally to the relative wind while the drag force D is the force which acts parallel to the relative wind, these forces both being projected from the resultant force R acting upon the wing. At supersonic section speeds, the drag force D comprises increments of drag including D1 which is the drag due to thickness, D2 which is the drag due to skin friction, and D3 which is the drag due to lift. In the following explanation, the forces comprising the drag D are neglected since they remain substantially uniform. Also, for the purposes of simplifying the diagrams of Figs. 5–11, the lift force L at supersonic speeds is resolved to a normal force N which is taken as a normal to the airfoil chord instead of as a normal to the relative wind. The force N is the one which will be used for explanation in the generation of lifting forces Fv.

Reference may now be made to Fig. 5 which shows a propeller 38 rotating away from the viewer and comprising a downsweeping blade 39 and an upsweeping blade 40. The propeller axis makes an angle A with respect to the relative wind.

Figure 6:
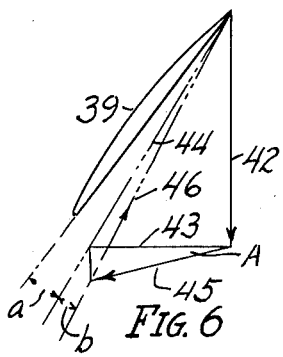
Fig. 6 is a diagram of a downwardly sweeping propeller blade showing velocity and angle of attack relationships.

Reference may now be made to Fig. 6 which shows an element of the downsweeping blade 39. The downward velocity of the blade element due to rotation is shown by the vector 42 and the horizontal forward velocity is indicated by the vector 43. Combining these, the direction and velocity of the normal relative wind on the blade (with no axis tilt) is indicated at 44. The blade 39 is set with respect to the line 44 at an appropriate angle of attack $a$. However, due to the tilt of the propeller axis through the angle A, the true forward velocity and direction of the blade in the relative wind is indicated by the vector 45 so that the true relative wind with respect to which the blade 39 moves is on the line 46. The line 46 is thus angularly displaced from the line 44 by an angle $b$ which adds to the angle $a$ to give a higher effective angle of attack to the downsweeping blade 39.

Figure 8:
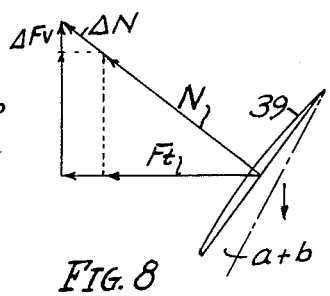
Fig. 8 is a force diagram to be used in conjunction with Fig. 6.

Now reference may be made to Fig. 8. Herein, the downsweeping blade element 39 is shown as operating at an angle of attack $a$ plus $b$. To the normal force N resulting from operation of the blade at the angle of attack $a$ is an additional force $\Delta N$ resulting from the angle of attack increment $b$. The forces N and $\Delta N$ resolve to horizontal and vertical components as noted. The horizontal and vertical components of $\Delta N$ add to the horizontal and vertical components of N to yield thrust force and the vertical lift force, both of which are larger than those normally resulting from operation at angle of attack $a$. The lift force increment is noted as $\Delta Fv$.

Figure 10:
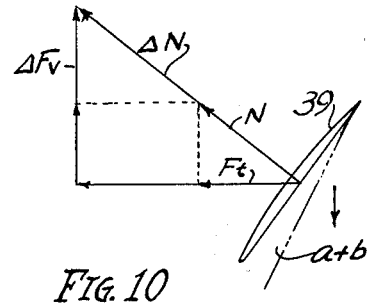
Fig. 10 is a force diagram similar to that of Fig. 8 but showing a different order of magnitude of forces.

Fig. 10 shows a similar view wherein, due to high speed operation and operation at a high increment $b$ of angle of attack, $\Delta N$ may be larger than N whereby the total thrust and lifting forces for the downsweeping blade are more than double those which would be normally obtained by operation at angle of attack $a$.

Figure 7:
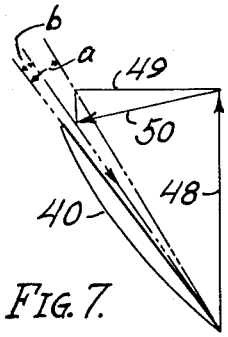
Fig. 7 is a diagram of an upwardly sweeping propeller blade showing velocity and angle of attack relationships.

Reference may now be made to Fig. 7 which shows the upsweeping blade element 40 having an upward velocity 48 due to propeller rotation and a forward velocity 49 due to aircraft velocity. Since operation is assumed where the propeller axis is tilted to the relative wind, the actual forward velocity and direction of the blade are shown by the vector 50. The angle $a$ again shows a normal blade angle of attack without the tilted propeller axis and the angle $b$ in this instance causes a decrease in angle of attack whereby the net angle of attack of the propeller blade is $a$ minus $b$.

Figure 9:
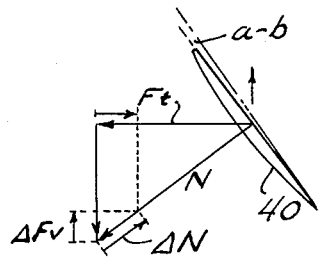
Fig. 9 is a force diagram to be used in conjunction with Fig. 7.

Referring now to Fig. 9, the blade 40 is shown in operation at angle of attack $a$ minus $b$ whereby the normal force N is decreased by $\Delta N$ and the horizontal and vertical components of these forces when added algebraically are correspondingly decreased. Thus the horizontal component is less than normal, and the downwardly acting vertical force is also substantially less than normal. Comparing Fig. 8 with Fig. 9, it will be seen that a net lifting force 2 ΔFv results from the upsweeping and downsweeping blades, this being equivalent to two times the vertical component of ΔN. Since the horizontal components of ΔN in Figs. 8 and 9 are equal and opposite, they balance out whereby the full normal horizontal force Ft which is the thrust of the propeller is developed. However, these horizontal components produce a bending couple on the propeller shaft.

Figure 11:
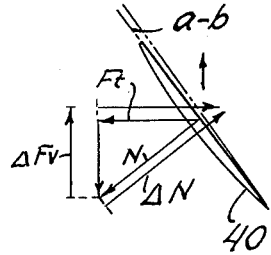
Fig. 11 is a force diagram similar to that of Fig. 9, but showing a different order of magnitude of forces.

Fig. 11 ties in with Fig. 10 and shows the upsweeping blade 40. The vertical component ΔFv of ΔN in both figures is in the same direction to produce a net lifting force Fv of large magnitude. The horizontal components of ΔN as between Figs. 10 and 11 are equal and opposite and cancel one another to leave the normal propulsive force Ft acting forwardly, plus a bending couple on the propeller shaft.

The diagrams of Figs. 6–11 only show two-dimensional characteristics with blade in the horizontal position where the maximum effect is secured from the transverse force. It should be clear to those familiar with the art that the forces may be calculated and integrated for the span of the blades, and also that an accurate determination may be made of the magnitude of the forces in all rotational positions of the blades. As was pointed out previously, a propeller having three or more blades will produce an overall constant transverse force Fv.

Thus, the tilting of the propeller axis through a positive angle creates a net lifting force. When aircraft speed and attitude, and propeller power, R. P. M. and pitch are appropriately controlled, a net lifting force of great magnitude is developed, the force being useful either in augmenting or in providing almost the entire lift for the aircraft.

A further increase in lifting forces derived from the propeller may be obtained through the use of propeller blades which have a moderate degree of torsional flexibility, and wherein the center of pressure on the propeller blade section lies forward of the torsional axes of the blade. The angle of attack on the downswinging blade would be increased an additional increment by twisting of the blade under influence of higher air loads, while the angle of attack of the upswinging blade would be decreased by an additional decrement due to reduction in the air loads. This use of "aero-torsional coupling" would not affect the forward thrust of the propeller but would increase the transverse force utilized for lift. If aero-torsional coupling is used, it would be necessary from the standpoint of structural strength to make the propeller rotational speed aperiodic with respect to and below the natural frequency of torsional vibrations of the propeller blade. An increase in lift of possibly 50% to 100% might be obtainable with properly designed torsionally flexible propeller blades over that produced by axis tilt alone with torsionally rigid blades.

Propeller lifting forces for predominant aircraft lift in place of wings as lifting devices can be very efficient at high speed. Analysis shows that a propeller so employed, when the angle of tilt (A) is of the order of 6° or less, is more efficient than the best supersonic wing design. With this in mind, the advantage of using this natural force for lift, in place of wing lift, is apparent for aircraft capable of transonic and supersonic forward speeds.

The configuration of aircraft shown in Figs. 1–3 is by no means limiting, but has certain advantages. By using a forward tractor propeller 16 and a rearward pusher propeller 17, the normally equal propeller lift forces Fv 16 and Fv 17 provide extremely stable sustention for the aircraft, minimizing longitudinal or pitching sensitivity. Yet, pitching control moments may readily be superimposed for maneuvering and navigation. When transient changes in angle A occur due to atmospheric disturbances, such changes will affect both propellers substantially simultaneously, preventing attitude changes in the craft although changing its position in space. In the control of the craft, one of the principal needs is precise sensing of overall angle of tilt A, with suitable mechanism responsive to this sensing to adjust angle A to maintain constant or desired amount of lift. For optimum performance, the body 15 would be arranged to operate at 0 angle of attack while the propellers operate at angle A. Alternatively, the body 15 may be designed to provide lift through flight at an optimum angle of attack while the propellers are tilted relative to the body to operate at angle A. With the tandem propeller configuration, the after propeller 17 is remote from the wash of forward propeller 16 so that its lift will be consistent.

Though one embodiment of the invention is shown, it is to be understood that the invention may be applied in various forms and in various environments. Changes may be made in the arrangements shown without departing from the spirit of the invention. Reference should be had to the appended claims for definition of the limits of the invention.

What is claimed is:

1. The method of operating a winged aircraft whose main wing is capable of providing not more than half the normal lift required for protracted sustained flight, the aircraft having oppositely rotating power driven propellers ahead of and rearward of the aircraft center of gravity, the propellers having axes alined in the general direction of flight, which consists in driving said propellers to produce thrust to drive the aircraft at a forward speed in excess of minimum transonic speed for a protracted period, and in controlling aircraft attitude so that the propeller axes make a positive substantially vertical angle of 2° to 12° to the relative wind for the same protracted period, whereby said propellers together develop upwardly directed lifting forces of magnitude to provide the additional lift required for protracted sustained aircraft flight.

2. The method of operating a winged aircraft having power driven oppositely rotating tandem propellers respectively ahead of and rearward of the aircraft center of gravity, which consists in driving the aircraft by said propellers at a speed in excess of minimum transonic speed, controlling the aircraft to fly at a positive angle of incidence so that the propeller axes make a positive vertical angle of between 2° and 12° to the relative wind, whereat the vertically-directed propeller side forces developed by propeller rotation and high speed flight reach a magnitude to yield aircraft lifting forces at least substantially equal to the aircraft lifting forces provided by the aircraft wing, and maintaining the aircraft at such speed and angle of incidence for a major portion of its flight path.

References Cited in the file of this patent

UNITED STATES PATENTS

| 1,414,241 | Wells | Apr. 25, 1922 |
| 1,523,671 | Tanner | Jan. 20, 1925 |

FOREIGN PATENTS

| 728,044 | Germany | Nov. 18, 1942 |

OTHER REFERENCES

Weick: "Aircraft Propeller Design," pp. 260, 262. McGraw-Hill, 1930.

Durand: "Aerodynamic Theory," vol. V, pp. 8, 9, 34, 35. Durand Reprinting Committee; Cal. Inst. Tech., 1943.